United States Patent
Busse et al.

(10) Patent No.: US 7,410,369 B2
(45) Date of Patent: *Aug. 12, 2008

(54) DISTRIBUTION CONNECTION MODULE FOR TELECOMMUNICATIONS AND DATA SYSTEMS TECHNOLOGY

(75) Inventors: Ralf-Dieter Busse, Waldersruh (DE); Harald Klein, Berlin (DE); Joachim Stark, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/893,262

(22) Filed: Aug. 15, 2007

(65) Prior Publication Data

US 2007/0285879 A1    Dec. 13, 2007

Related U.S. Application Data

(63) Continuation of application No. 10/311,258, filed as application No. PCT/EP01/06134 on May 30, 2001, now Pat. No. 7,270,551.

(30) Foreign Application Priority Data

Jun. 15, 2000    (DE)    ................................ 100 29 649

(51) Int. Cl.
   *H01R 12/00*    (2006.01)
(52) U.S. Cl. ........................ 439/76.1; 439/188; 439/912
(58) Field of Classification Search ................ 439/76.1, 439/676, 66, 92, 344, 189, 395, 98, 620.01, 439/941, 86, 540.1, 188, 912
   See application file for complete search history.

(56) References Cited

U.S. PATENT DOCUMENTS

| | | |
|---|---|---|
| 4,477,134 A | 10/1984 | Wright |
| 5,024,798 A | 6/1991 | Cloud et al. |
| 5,086,368 A | 2/1992 | Gerke et al. |
| 5,106,273 A | 4/1992 | Lemarquand et al. |
| 5,125,846 A | 6/1992 | Sampson et al. |
| 5,177,782 A | 1/1993 | Henderson et al. |
| 5,495,383 A | 2/1996 | Yoshioka et al. |
| 5,538,435 A | 7/1996 | Yohn |
| 5,639,262 A | 6/1997 | Lim |
| 5,673,480 A | 10/1997 | Buchheister, Jr. et al. |
| 5,746,609 A | 5/1998 | Franks, Jr. |
| 5,805,404 A | 9/1998 | Kane et al. |
| 5,936,821 A | 8/1999 | Busse et al. |
| 5,980,337 A | 11/1999 | Little |
| 6,026,160 A | 2/2000 | Staber et al. |
| 6,074,256 A | 6/2000 | Arnett |
| 6,086,415 A | 7/2000 | Sanchez et al. |

(Continued)

FOREIGN PATENT DOCUMENTS

DE    27 25 551 A1    12/1978

(Continued)

*Primary Examiner*—Neil Abrams
*Assistant Examiner*—Phuong Nguyen
(74) *Attorney, Agent, or Firm*—Merchant & Gould P.C.

(57) ABSTRACT

A distribution connection module (1) for telecommunications and data technology includes a housing (3) in which input and output contacts (4, 5) for the connection of cables or wires are arranged such that they are externally accessible. The housing (3) is designed with a cavity in which functional elements are arranged between the input and output contacts (4, 5).

18 Claims, 6 Drawing Sheets

U.S. PATENT DOCUMENTS

| | | |
|---|---|---|
| 6,135,794 A | 10/2000 | Kwon et al. |
| 6,157,287 A | 12/2000 | Douglass et al. |
| 6,166,894 A | 12/2000 | Kane |
| 6,168,474 B1 | 1/2001 | German et al. |
| 6,229,890 B1 | 5/2001 | Kerr et al. |
| 6,307,515 B1 | 10/2001 | Sauer et al. |
| 6,358,093 B1 | 3/2002 | Phommachanh et al. |
| 6,371,780 B1 | 4/2002 | Aponte et al. |
| 6,482,039 B2 | 11/2002 | Phommachanh et al. |
| 6,558,207 B1 | 5/2003 | Pepe et al. |
| 7,018,229 B2 | 3/2006 | Otto et al. |
| 7,270,551 B2 | 9/2007 | Busse et al. |

FOREIGN PATENT DOCUMENTS

| | | |
|---|---|---|
| DE | 38 36 668 C1 | 3/1990 |
| DE | 39 09 783 C1 | 10/1990 |
| DE | 39 17 270 A1 | 11/1990 |
| DE | 40 26 004 A1 | 2/1992 |
| DE | 196 08 517 C1 | 8/1997 |
| DE | 37 10 616 C1 | 3/1998 |
| DE | 197 14 868 A1 | 10/1998 |
| DE | 198 16 678 C1 | 1/2000 |
| DE | 299 20 935 U1 | 3/2000 |
| EP | 0 209 046 A2 | 1/1987 |
| EP | 0 621 660 | 10/1994 |
| EP | 0 623 978 | 11/1994 |

DISTRIBUTION CONNECTION MODULE FOR TELECOMMUNICATIONS AND DATA SYSTEMS TECHNOLOGY

CROSS REFERENCE TO RELATED APPLICATIONS

This application is a continuation of U.S. application Ser. No. 10/311,258, filed Dec. 12, 2002 now U.S. Pat. No. 7,270,551; U.S. application Ser. No. 10/311,258 claims priority benefit to PCT International Application No. PCT/EP01/06134, filed May 30, 2001 and DE 100 29 649.1, filed Jun. 15, 2000; which applications are incorporated herein by reference.

FIELD OF THE INVENTION

The invention relates to a distribution connection module for telecommunications and data technology, comprising a housing in which input and output contacts for the connection of cables or wires are arranged such that they are externally accessible, and to a method for producing the distribution connection modules.

BACKGROUND OF THE INVENTION

Such a distribution connection module is known, for example, from DE 27 25 551. The distribution connection module comprises a first row of connecting contacts on the cable side and, opposite this, a second row of connecting contacts on the jumper side, in which case the contacts on the cable side may be regarded as input contacts, and the contacts on the jumper side may be regarded as output contacts, even when the information flow may be in the opposite direction. Center contacts, into which test or protection connectors can be inserted, are arranged between the rows. Three-point or five-point overvoltage protection modules or coordinated protection circuits represent one example of such protection connectors. If such an overvoltage protection device is now inserted into the center contacts, then this center tap and, in some cases, adjacent center taps as well, is no longer accessible for inspection and test purposes, or the overvoltage protection device must be removed again for test and inspection purposes, so that the contacts are not protected during this time.

Furthermore, distribution connection modules are known, for example, from DE 39 17 270, in which functional elements such as coordinated protection circuits can be inserted into the distribution connection module at the sides or from underneath. A disadvantage in this case is that the distribution connection modules have to be manufactured in a correspondingly complex manner.

A common feature of all distribution connection modules is that the external functional elements must be plugged into sprung contacts, which need to be subject to stringent requirements with regard to the withstand voltage and current carrying capacity. A further disadvantage is that the external functional elements cause interference in compact, modular designs.

SUMMARY OF THE INVENTION

The invention is thus based on the technical problem of providing a distribution module for telecommunications and data technology, by means of which simpler and more compact construction is possible. A further technical problem is to provide a production method.

According to the invention a distribution connection module for telecommunications applications and for data systems is provided with a housing in which input and output contacts for the connection of cables or wires are arranged such that they are externally accessible. For this purpose, the housing of the distribution connection module is designed with a cavity in which functional elements are arranged between the input and output contacts. This results in the capability for very compact construction. In this case, in principle, the housing may be formed in one or more parts.

In one preferred embodiment, the functional elements are arranged on a printed circuit board which is supported in the housing. For this purpose, the housing is preferably designed in a number of parts, so that the printed circuit board can be pushed into a first housing part, and can then be locked in place by means of a second housing part. Depending on the application, differently populated printed circuit boards can thus be used, and defective printed circuit boards replaced, very easily.

The input contacts are preferably in the form of insulation-displacement contacts, so that the wires and cables on the cable side can be connected quickly, reliably and flexibly using known techniques. Depending on the application, the output contacts are preferably likewise in the form of insulation-displacement contacts or plug connectors. The advantage of plug connectors is that, if prefabricated cables are available, the wiring process can be carried out very quickly and reliably simply by plug insertion. In situations where there are no prefabricated cables, the advantages of insulation-displacement contacts are applicable, on the other hand.

In a further preferred embodiment, the insulation-displacement contacts are each in the form of a contact in the form of a fork, by means of which a force-fitting electrical connection to the functional elements can be produced. If the functional elements are arranged on a printed circuit board, then contact pads are arranged on the printed circuit board, preferably on both sides, on the top and bottom. These force-fitting connections are considerably more tolerant to manufacturing and assembly tolerances than soldered joints. In this way, all the insulation-displacement contacts can simultaneously make contact with the contact pads by latching the contacts in the form of forks onto the contact pads. Furthermore, this method of making contact allows simple disassembly if, for example, a defective printed circuit board needs to be replaced.

Functional elements may be filter circuits, signaling devices or test circuits. In one preferred embodiment, the functional element is an overvoltage protection module, in particular a coordinated protection device. This results in integrated overvoltage protection which neither prevents subsequent jumpering, inspection or testing nor causes interference when module groups are assembled.

In a further preferred embodiment, each input and output contact has an associated isolating contact, which is externally accessible. The isolating contact is in each case arranged in series behind the functional elements. If the functional elements are in the form of overvoltage protection, the isolating contact is fully protected.

If the functional elements are arranged on a printed circuit board, the isolating contacts are preferably arranged on the underneath of the printed circuit board, with the isolating contacts preferably being accessible from the same side as the input contacts.

In a further preferred embodiment, the output contacts are arranged on the opposite side of the housing to the input contacts. This achieves clear separation between the cable side and the jumpering side, in which case there is no interference between the individual wires and cables.

If the input and/or output contacts are in the form of insulation-displacement contacts, then they are dimensioned with respect to one another in such a way that the existing standard connecting tools can be used. This saves the development of new and costly connecting tools, and simplifies the handling of the new distribution connection module in conjunction with already existing distribution connection modules.

In a further preferred embodiment, the ground lines on the printed circuit board are formed by a contact which is in the form of a ring or fork and is externally accessible. To this end, ground lines are preferably joined together on the printed circuit board. The distribution connection module can then be pushed onto profiled rods using appropriate holes or openings, with the profiled rods then being connected to the contact which is in the form of a ring or fork.

In a further preferred embodiment, the ground lines are designed to be accessible from the input contact side. This optionally allows the distribution connection module to be used as an AB or ABS module, with the shields being connected to the ground lines.

In order to produce the distribution connection module according to the invention, the printed circuit board, with the functional elements, is pushed into a first housing part, and a second housing part, which is fitted with the input contacts, is latched onto it. The advantage of this method is that the component placement process and the latching can easily be automated. In embodiments with isolating contacts, there are in principle various variants.

In a first preferred embodiment, the isolating contacts are firstly mounted on the printed circuit board, where the isolating contacts are clamped in an appropriate manner. The printed circuit board is then pushed, with the clamped-in isolating contacts, into the first housing part, which is then latched to the second housing part. In consequence, no furnishings are required on the housing to adversely affect its robustness.

In an alternative embodiment, the printed circuit board is first of all pushed into the first housing part, and the isolating contacts are then attached to the printed circuit board and clamped in from the underneath of the housing. This makes it possible to retrofit the distribution connection modules with isolating contacts very easily.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
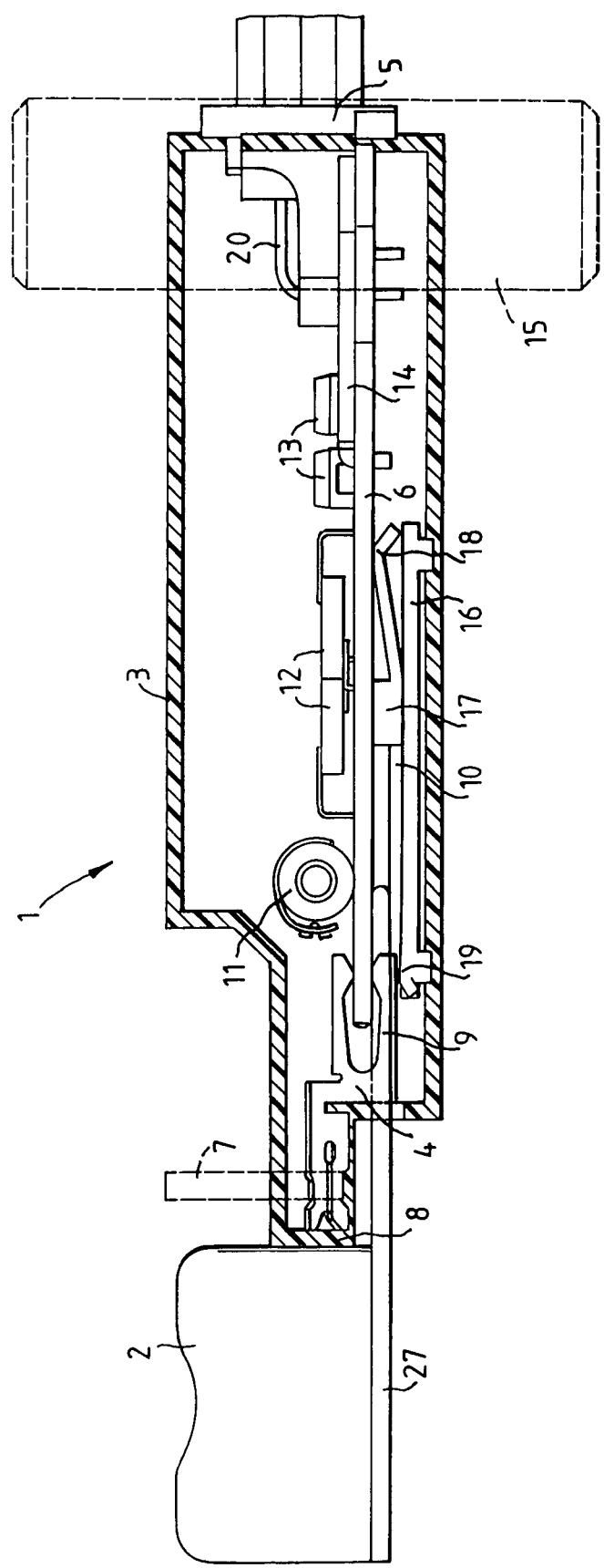
FIG. 1 is a cross sectional view through a distribution connection module according to the invention.

Referring to the drawings in particular, FIG. 1 shows a cross section of the distribution connection module 1 with a test connector 2 inserted. The distribution connection module 1 comprises a housing 3, input contacts 4, output contacts 5 and a printed circuit board 6 arranged in the cavity in the housing 3. The input contacts 4 are in the form of insulation-displacing contacts for making contact with wires 7 which are accessible from a first end face 8 of the housing 3. On the side facing the printed circuit board 6, the input contacts 4 are formed with contacts 9 in the form of forks. The contacts 9 in the form of forks engage around the printed circuit board 6 and form a force-fitting connection to contact pads arranged on the top and bottom of the printed circuit board 6. Coordinated protection circuits are arranged on the printed circuit board 6, and are located between the input contacts 4 and the output contacts 5. In this case, each coordinated protection device has two associated input contacts 4 and two associated output contacts 5. The coordinated protection device comprises a surge arrester 11, two PTC thermistors 12 and two diodes 13, whose ground lines are connected via a contact 14, in the form of a ring or fork, to a profiled rod 15 which passes through the housing 3. Located behind the coordination protection device is the isolating contact 10, which is arranged on the underneath of the printed circuit board 6, with the printed circuit board 6 being plated through, for example close to the diodes 13, for electrical connection of the coordinated protection device and the isolating contact 10. The isolating contact 10 is located on a support 16 which is fixed in the housing 3. The isolating contact 10 is prestressed in a sprung manner via a clamping device 17, so that the bent contacts 18, 19 make contact with the printed circuit board 6. Behind the contact 19 there is an electrical connection to the output contacts 5, which are connected to the printed circuit board 6 via a soldered, press or plug connection 20. Thus, without a test connector 2, the input contacts 4 are connected via the coordinated protection device and the downstream isolating contact 10 to the output contacts 5. For test purposes, a test connector 2 with a board 27 can then be pushed into the housing 3 from the end face 8. In consequence, the contact 19 of the isolating contact 10 is pushed away from the printed circuit board 6, as shown, and the electrical connection between the input and output contacts 4, 5 is disconnected or is made via the test connector 2. Since the isolating contact 10 is arranged behind the coordinated protection device, the isolating contact 10 remains fully protected against overvoltage even during test activities using the test connector 2. Since large forces can occur when connecting the insulation-displacement contacts, a holding or supporting element in the form of plastic can also be latched onto the printed circuit board 6 in the area of the contacts 9 in the form of forks and over the full width of the printed circuit board 6, thus fixing the contacts 9 in the form of forks on the printed circuit board 6.

Figure 2:
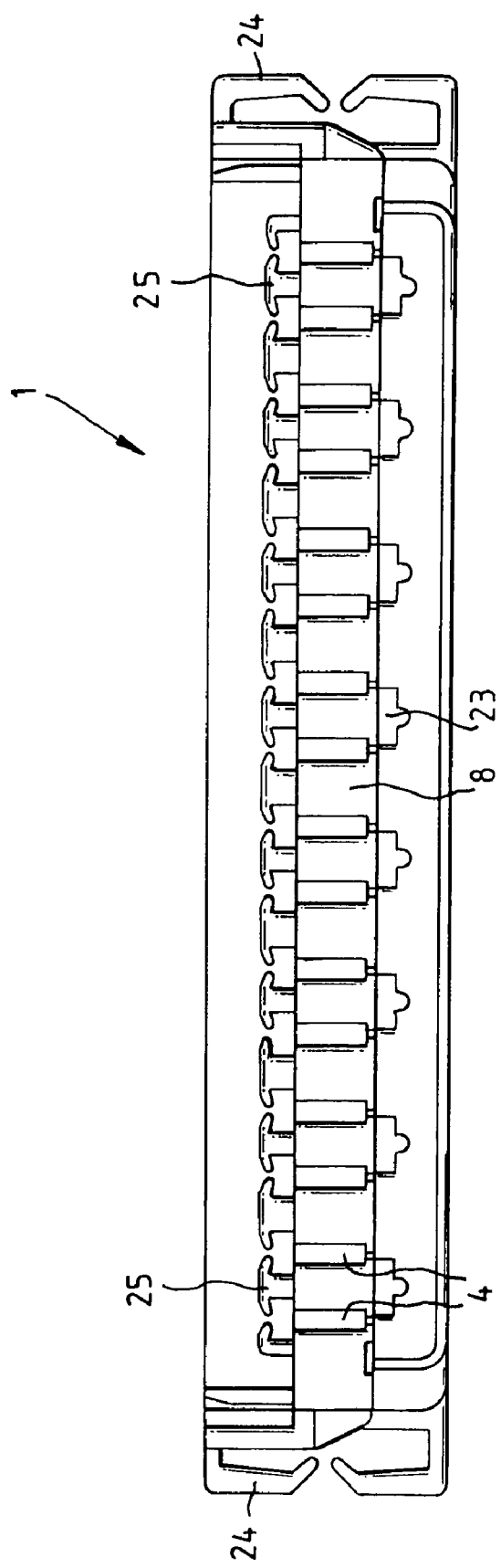
FIG. 2 is a front view of a distribution connection module.

FIG. 2 shows a front view of the end face 8 of the distribution connection module 1. The distribution connection module 1 has 16 input contacts 4 which are combined in pairs and are used, for example, for connecting pairs of wires. An access 23 for a test connector 2 is arranged under each pair of input contacts 4. The isolating contacts 10 are externally accessible via this access 23. In this case, the two isolating contacts 10 of the two input contacts 4 are operated at the same time by inserting a test connector 2 into the access 23. The housing 3 also has cable guides 24 and strain-relief devices 25.

Figure 3:
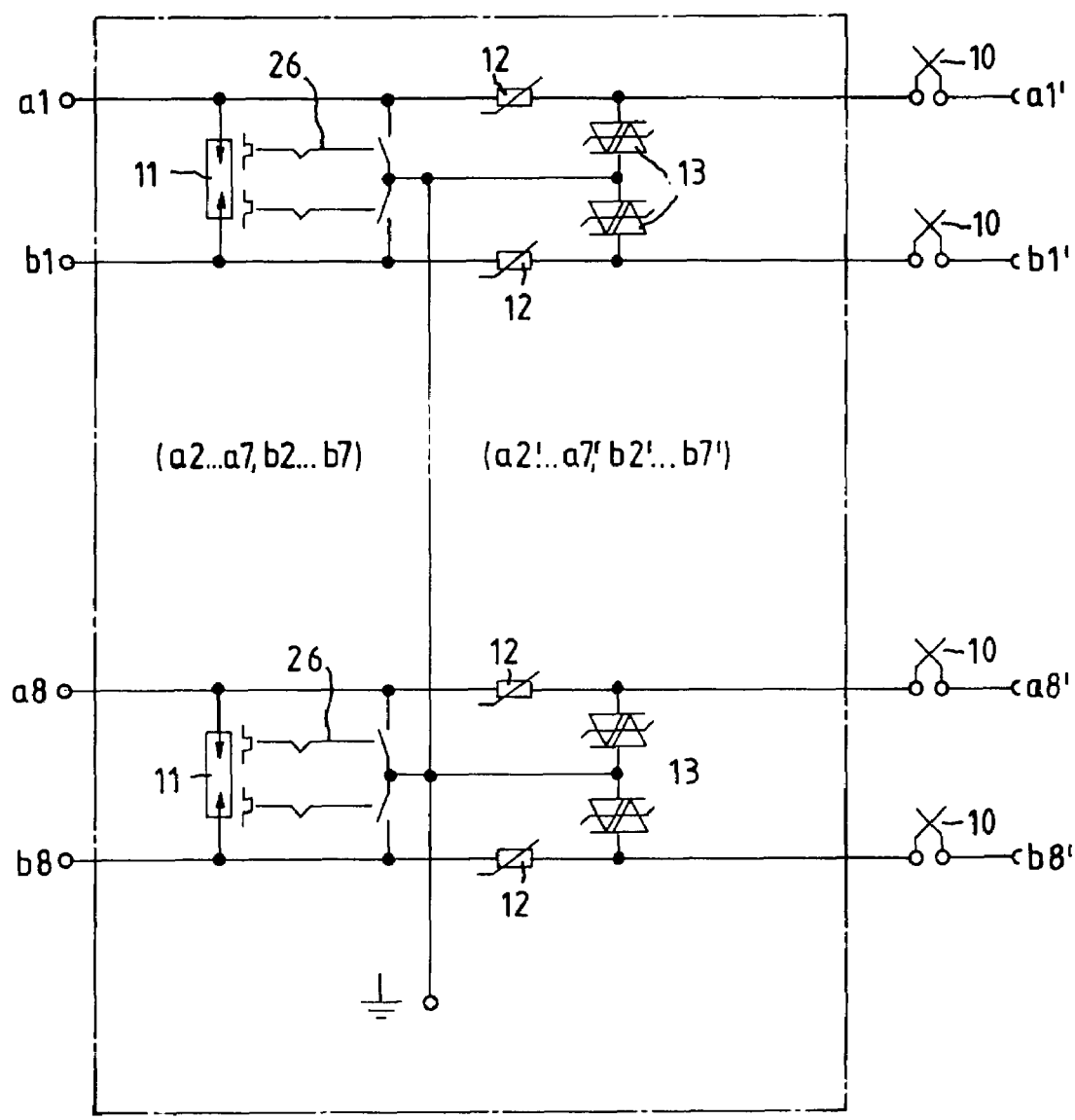
FIG. 3 is a schematic circuit arrangement of a distribution connection module with coordinated protection.

FIG. 3 shows, schematically, the circuit arrangement for a distribution connection module having coordinated protection devices as functional elements. The circuit has 16 input contacts a1, b1-a8, b8 and 16 output contacts a1', b1'-a8', b8', with each a, b pair being used to connect a pair of wires. The input and output contacts a, b and a', b', respectively, in this case correspond to the input and output contacts 4, 5 in FIG. 1. In this case, two input contacts in each case have an associated coordinated protection device. As already described in FIG. 1, each coordinated protection device comprises a three-pole surge arrester 11, two PTC thermistors 12 and two diodes 13. Each surge arrester 11 has an associated fail-safe contact 26 with at least one fuse element, which permanently shorts the two input contacts a, b to ground when an overvoltage occurs. The two isolating contacts 10 are arranged between the coordinated protection device and the two associated output contacts a', b'.

Figure 4:
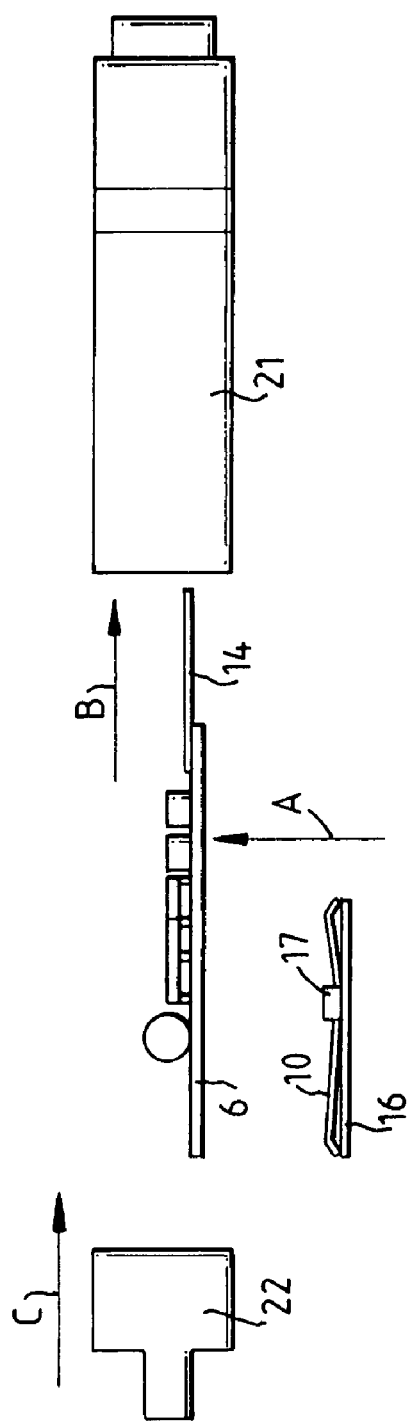
FIG. 4 is a schematic method sequence for producing a distribution connection module.

FIG. 4 shows, schematically, a production method for a distribution connection module 1 as shown in FIG. 1. In a first method step A, the isolating contacts 10 with their clamping devices 17 are mounted on a common support or separate support 16 on the underneath of the printed circuit board 6. Then, in a method step B, the fully populated printed circuit board 6 is pushed into the cavity of a first housing part 21. Then, in a further method step C, a second housing part 22, in which the input contacts 4 are arranged, is latched onto the first housing part 21.

Figure 5:
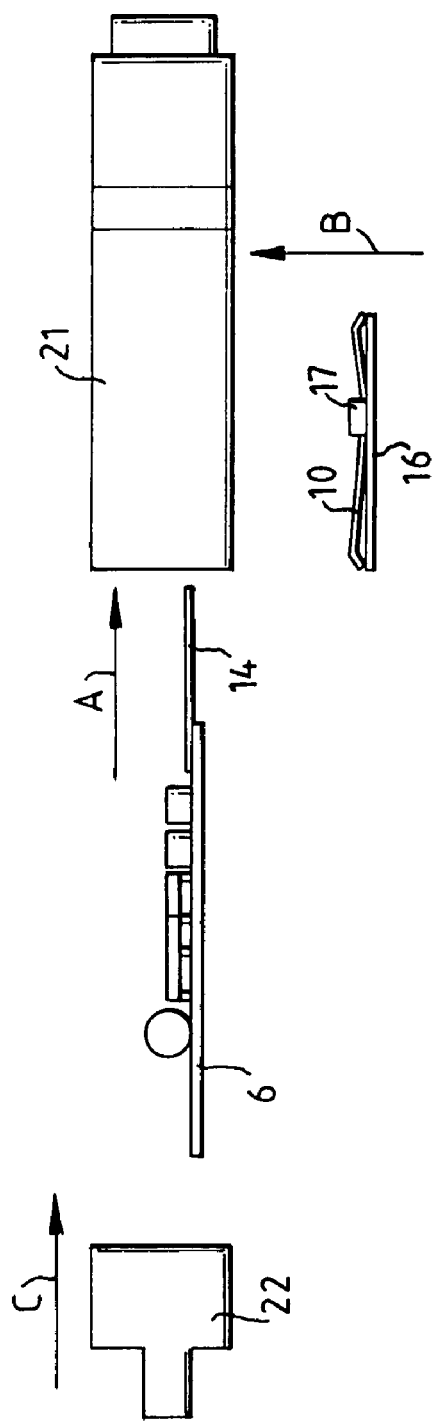
FIG. 5 is a schematic method sequence for an alternative method for producing a distribution connection module.

FIG. 5, shows schematically, an alternative production method. In this case, the fully populated printed circuit board 6 is first of all pushed into the first housing part 21 in a first method step A and then, in a method step B, the isolating contacts 10 are inserted from the underneath of the first housing part 21. The second housing part 22 is then once again latched onto the first housing part 21, in the method step C.

Figure 6:
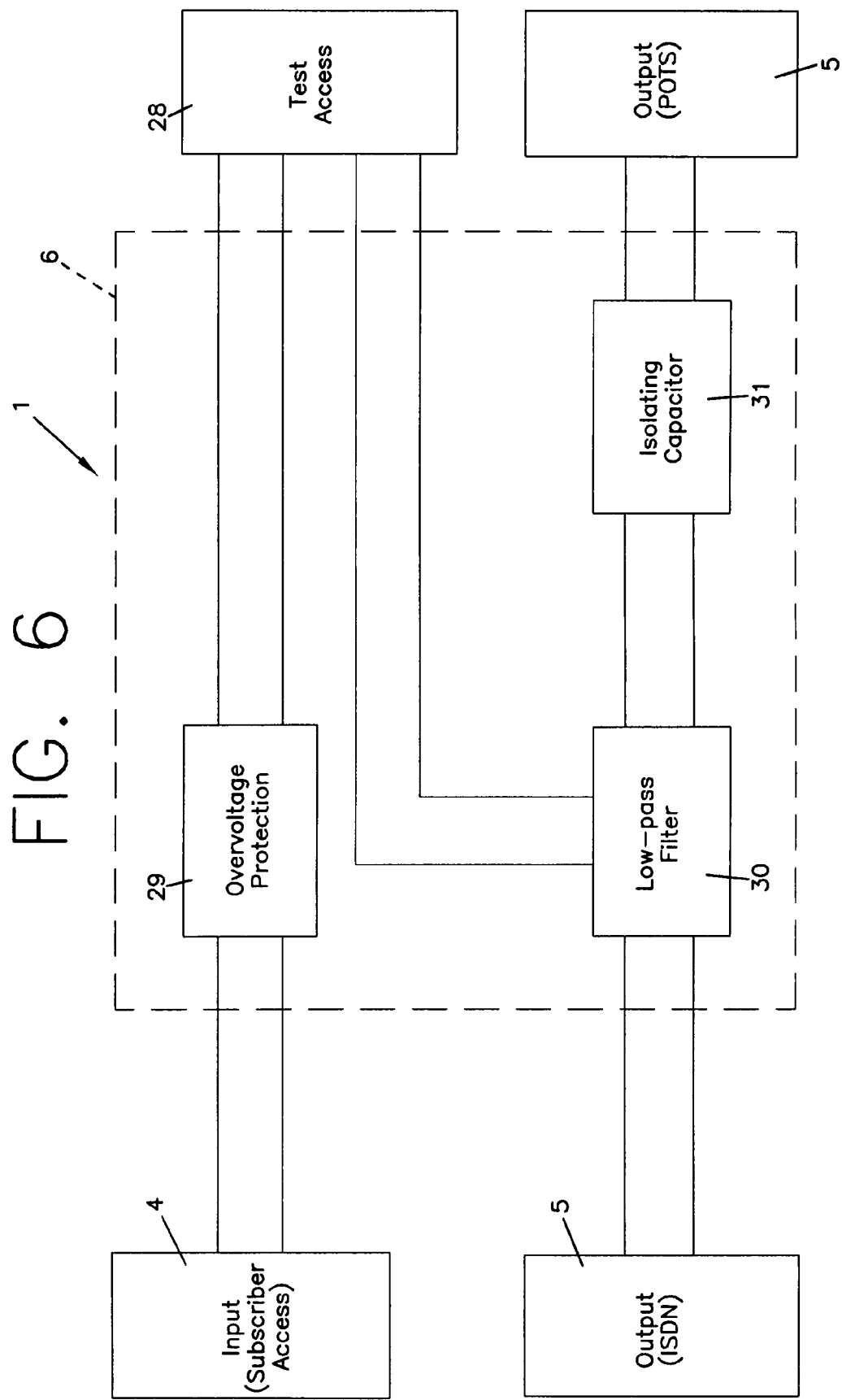
FIG. 6 is a block diagram of a distribution connection module having an Asymmetric Digital Subscriber Line ADSL splitter.

FIG. 6 shows a block diagram of a distribution connection module 1 having an ADSL splitter as a functional group, in which case ADSL represents an Asymmetric Digital Subscriber Line. ADSL is a transmission technology for providing broadband data terminations via the conventional copper-cable access network. ADSL systems are, without exception, designed as bi-directional transmission systems using both traffic directions (downstream and upstream). The downstream channel, in the direction of the user, is designed to be broadband while, in contrast, the upstream channel in the opposite direction has a relatively narrow bandwidth and is intended primarily for transmitting control messages. Application examples for ADSL include, in particular, video on demand and multimedia Internet applications. The distribution connection module 1 has input contacts 4, output contacts 5 and test accesses 28. Furthermore, the distribution connection module 1 has at least one printed circuit board 6 on which overvoltage protection 29, a low-pass filter 30 and an isolating capacitor 31 are arranged. The ADSL splitter is formed by the low-pass filter 30 and the isolating capacitor 31 and isolates the radio-frequency ADSL signal, which is produced at the right-hand output 5, from a low-frequency Plain Old Telephone System (POTS) or Integrated Services Digital Network (ISDN) signal, which is produced at the left-hand output 5 while, in contrast, the input 4 represents the subscriber access.

For clarification, it should be noted that, due to the bi-directional transmission, signals are transmitted from the input 4 to the output 5 and vice versa, so that the terms "input" and "output" relate to the different information-technology connection sides of the distribution connection module 1. The isolating capacitor 31 is used to isolate the DC operating voltage from the ADSL port. In applications where this function is already provided in the DSLAM (Digital Subscriber Line Access Multiplexer), the isolating capacitor 31 can be omitted. The filter characteristic of the low-pass filter 30 is preferably matched to the ADSL systems used in DTAG, which use only the 138 kHz frequency band, and are thus also ISDN-compatible. In principle, other configurations with special optimization to individual services are feasible. The optional overvoltage protection 29 is used for protection against transient overvoltages, and improves the capability of the assembly to withstand voltages resulting from pulsed interference at, for example, 4 kV. The test accesses 28, which are preferably in the form of plug connectors, in particular SUB-D plug connectors, are used in order to permanently feed the signal on the subscriber line to an external switching device and test set, and back again. The splitter can be operated without this external loop by inserting an appropriate short-circuiting connector. The main type of operation for the ADSL splitter is as the main distribution module. The isolating capacitor 31 is used to isolate the DC operating voltage from the ADSL port. In applications where this function is already provided in the DSLAM (Digital Subscriber Line Access Multiplexer), the isolating capacitor 31 can be omitted. The filter characteristic of the low-pass filter 30 is preferably matched to the ADSL systems used in DTAG, which use only the 138 kHz frequency band, and are thus also ISDN-compatible. In principle, other configurations with special optimization to individual services are feasible. The optional overvoltage protection 29 is used for protection against transient overvoltages, and improves the capability of the assembly to withstand voltages resulting from pulsed interference at, for example, 4 kV. The test accesses 28, which are preferably in the form of plug connectors, in particular SUB-D plug connectors, are used in order to permanently feed the signal on the subscriber line to an external switching device and test set, and back again. The splitter can be operated without this external loop by inserting an appropriate short-circuiting connector. The main type of operation for the ADSL splitter is as the main distribution module.

Figure 7:
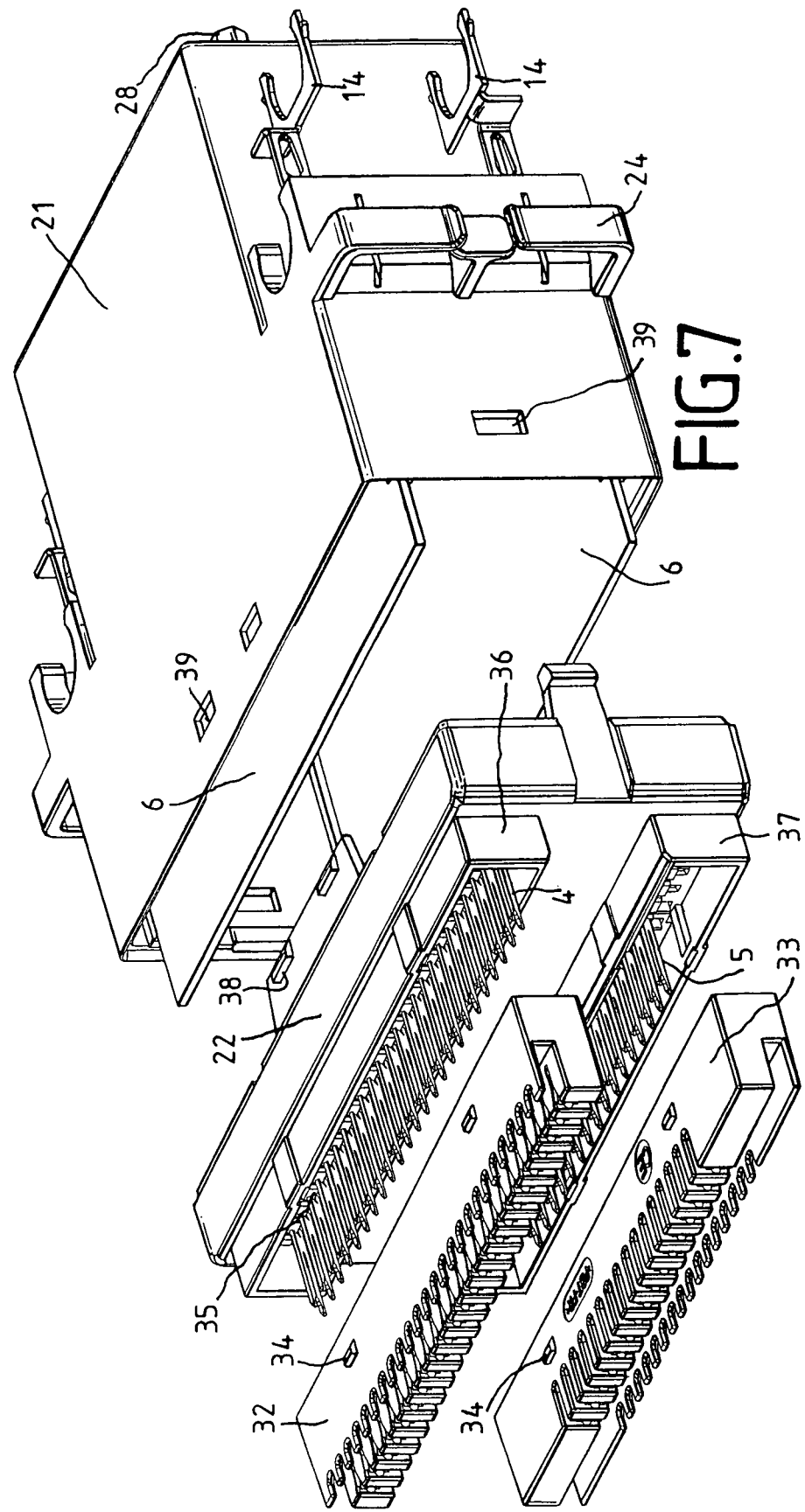
FIG. 7 is an exploded illustration of a distribution connection module.

FIG. 7 shows an exploded illustration of the distribution connection module 1 shown in FIG. 6. The distribution connection module 1 has a first housing part 21 and a second housing part 22. The second housing part 22 has a row of input contacts 4 and output contacts 5, which are each in the form of insulation-displacement contacts. The input contacts 4 and the output contacts 5 are each arranged in connection strips, whose housing upper parts 32 and 33, respectively, are latched on via the insulation-displacement contacts. The housing upper parts 32, 33 are each formed with latching elements 34, which engage in corresponding latching grooves 35 in the housing lower parts 36, 37 of the connection strips. The connection strip is preferably in the form of an ABS strip, so that a shield which is associated with the double conductors can also be connected, thus improving the crosstalk attenuation between the subscriber lines on which the ADSL signal is carried. The output contacts 5 form the ports for the POTS/ISDN lines. The second housing part 22 also has latching means 38, which correspond with corresponding latching grooves 39 in the first housing part 21. Two printed circuit boards 6 are arranged in the first housing part 21 and are electrically connected to the input contacts 4 and output contacts 5. The test accesses 28 and the other output contacts 5 for the ADSL port are arranged on the rear face of the first housing part 21, and are preferably each in the form of SUB-D plug connectors. On the side walls, the first housing part 21 is formed with cable bushings 24 and two annular contacts 14, via which the ground lines of the printed circuit board 6 are connected to a profiled rod 15 which is used as a ground rail.

While specific embodiments of the invention have been shown and described in detail to illustrate the application of the principles of the invention, it will be understood that the invention may be embodied otherwise without departing from such principles.

We claim:

1. A distribution connection module, comprising:
   a module housing;
   a printed circuit board located within the housing;
   input contacts, functional elements, an isolating contact, and output contacts arranged in electrical series on the printed circuit board respectively, each of the input, isolating and output contacts being partly located within the housing and accessible from the outside of the housing;
   wherein the input contacts each have a first connection end for piercing the insulation of cables or wires and a second connection end, the first connection end being accessible from the outside of the housing and configured for the connection of an external wire, the second connection end being configured to connect to and disconnect from the printed circuit board.

2. The distribution connection module of claim 1, wherein each of the output contacts includes one of an insulation-displacement contact and an electrical plug connector that is accessible from the outside of the housing.

3. The distribution connection module of claim 1, wherein the input contacts and the output contacts are located at opposite end faces of the housing.

4. The distribution connection module of claim 1, wherein the isolating contact includes a first contact portion and a second contact portion that each electrically engage the printed circuit board, and wherein the first contact portion electrically disengages from the printed circuit board when a test connector is inserted into an access opening of the housing.

5. The distribution connection module of claim 4, wherein the isolating contact is configured to electrically interconnect the inserted test connector downstream from the functional elements.

6. The distribution connection module of claim 1, wherein the functional elements include a ground contact and a surge arrester, the surge arrester being configured to short the input contacts to ground when an overvoltage occurs.

7. The distribution connection module of claim 6, wherein the isolating contact is protected from the overvoltage by the functional elements.

8. The distribution connection module of claim 1, further including an Asymmetric Digital Subscriber Line (ADSL) splitter.

9. The distribution connection module of claim 8, wherein the ADSL splitter includes a low-pass filter and an isolating capacitor.

10. The distribution connection module of claim 1, wherein the first connection ends of the input contacts are insulation displacement contacts and the second connection ends are forked contacts.

11. The distribution connection module of claim 10, wherein the forked contact of each input contact provides an electrical connection with at least one of the functional elements through a force-fitting electrical connection with a contact pad of the printed circuit board.

12. The distribution connection module of claim 11, wherein the force-fitting electrical connections permit a user to slidably detach the input contacts from the printed circuit board so that the printed circuit board can be removed from the housing.

13. The distribution connection module of claim 1, wherein ground lines are printed on the printed circuit board, the ground lines being accessible from the outside of the housing.

14. The distribution connection module of claim 13, wherein the ground lines printed on the printed circuit board are electrically connected to a ground contact that is accessible from the outside of the housing.

15. The distribution connection module of claim 14, wherein the ground contact is one of a ring and a fork.

16. The distribution connection module of claim 1, wherein the functional elements provide overvoltage protection in the form of a coordinated protection circuit.

17. The distribution connection module of claim 16, wherein the coordinated protection circuit includes a surge arrester, a thermistor, and a diode.

18. The distribution connection module of claim 16, wherein the isolating contact is protected from an overvoltage by the coordinated protection circuit.

* * * * *